March 23, 1926.

W. C. JAMESON

TUNNELING MACHINE

Filed June 19, 1924

W. C. Jameson INVENTOR

BY Victor J. Evans ATTORNEY

WITNESS:

March 23, 1926.

W. C. JAMESON

TUNNELING MACHINE

Filed June 19, 1924    5 Sheets-Sheet 2

1,577,528

W. C. Jameson  INVENTOR

BY Victor J. Evans  ATTORNEY

WITNESS: P. A. Thomas

March 23, 1926.  1,577,528
W. C. JAMESON
TUNNELING MACHINE
Filed June 19, 1924   5 Sheets-Sheet 3
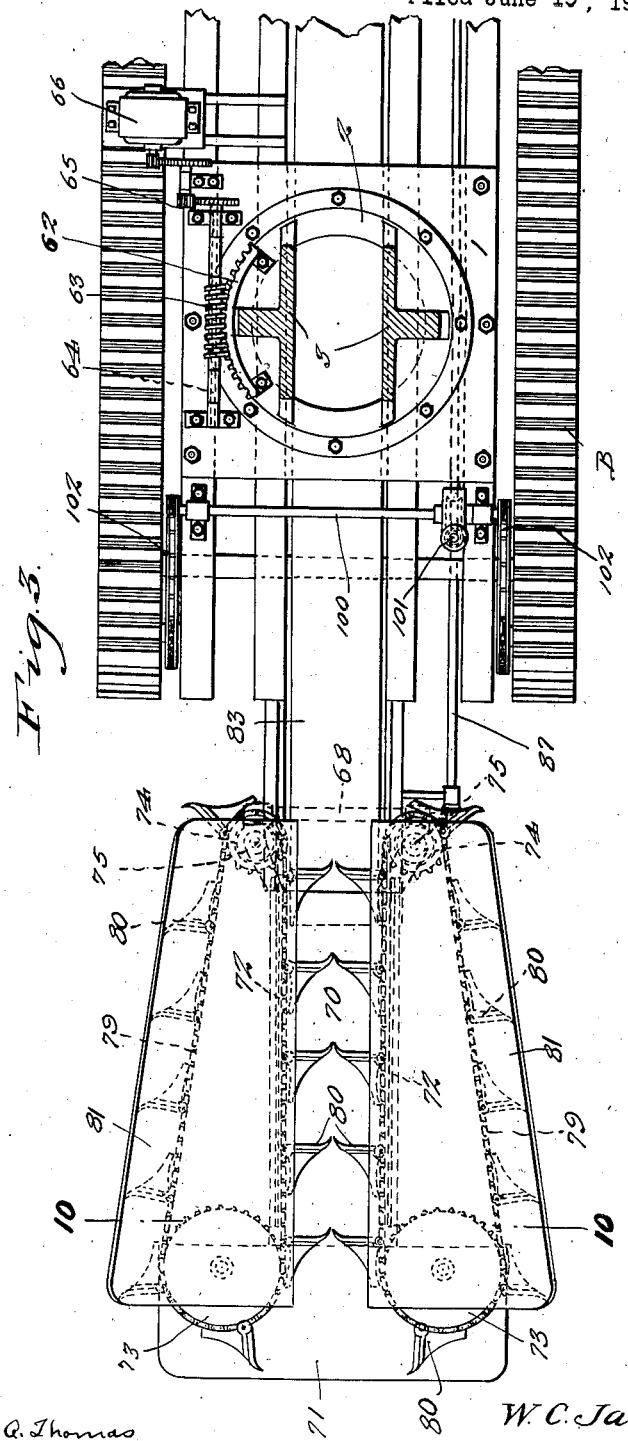
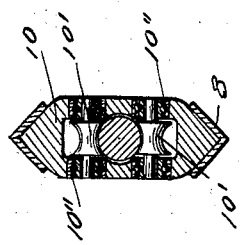
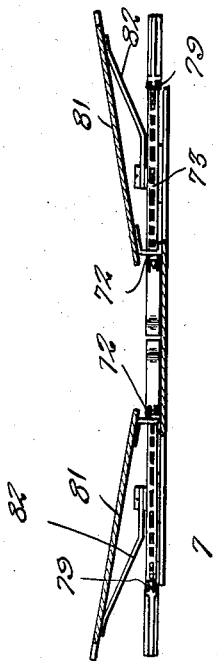
W. C. Jameson INVENTOR
BY Victor J. Evans ATTORNEY

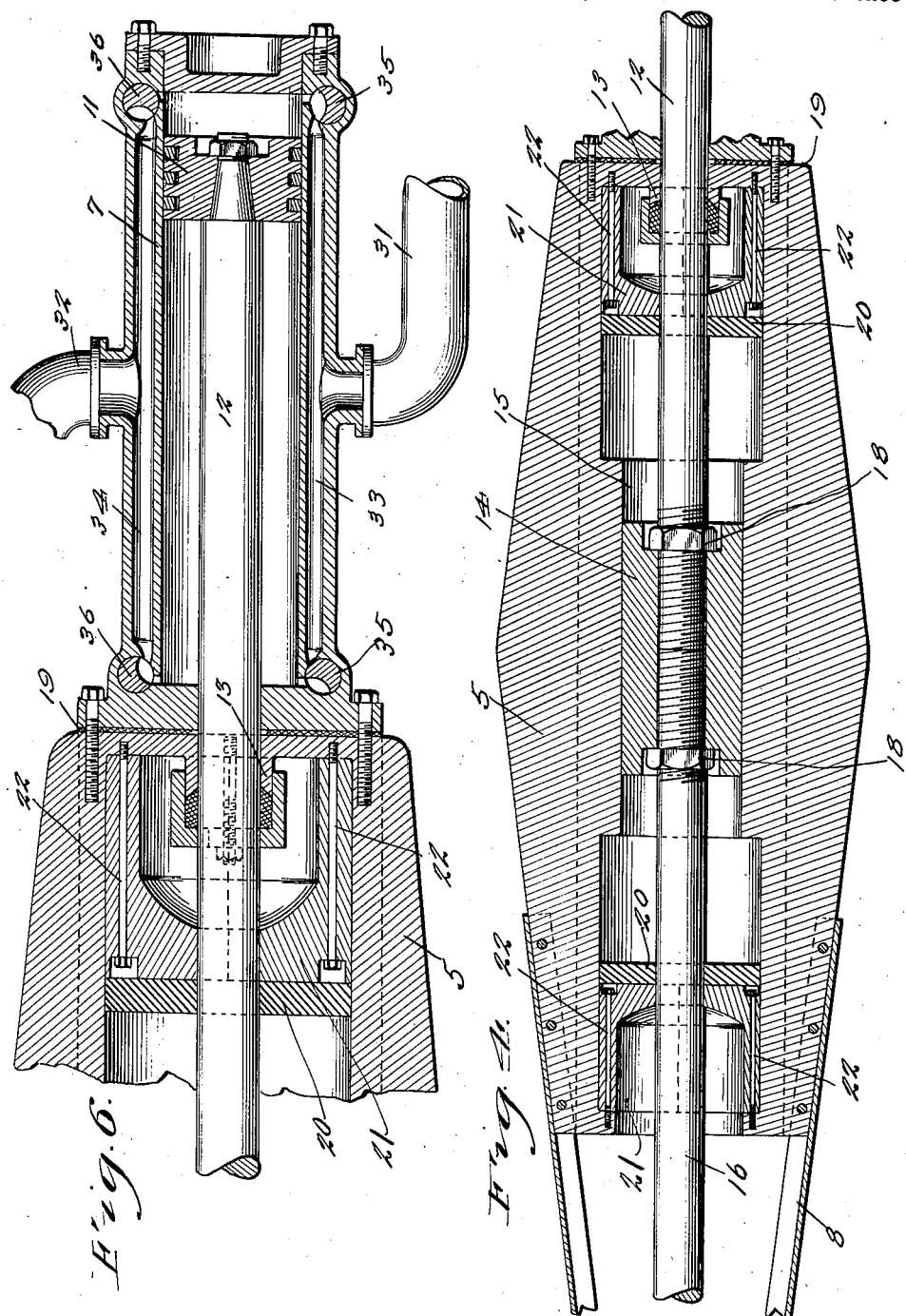

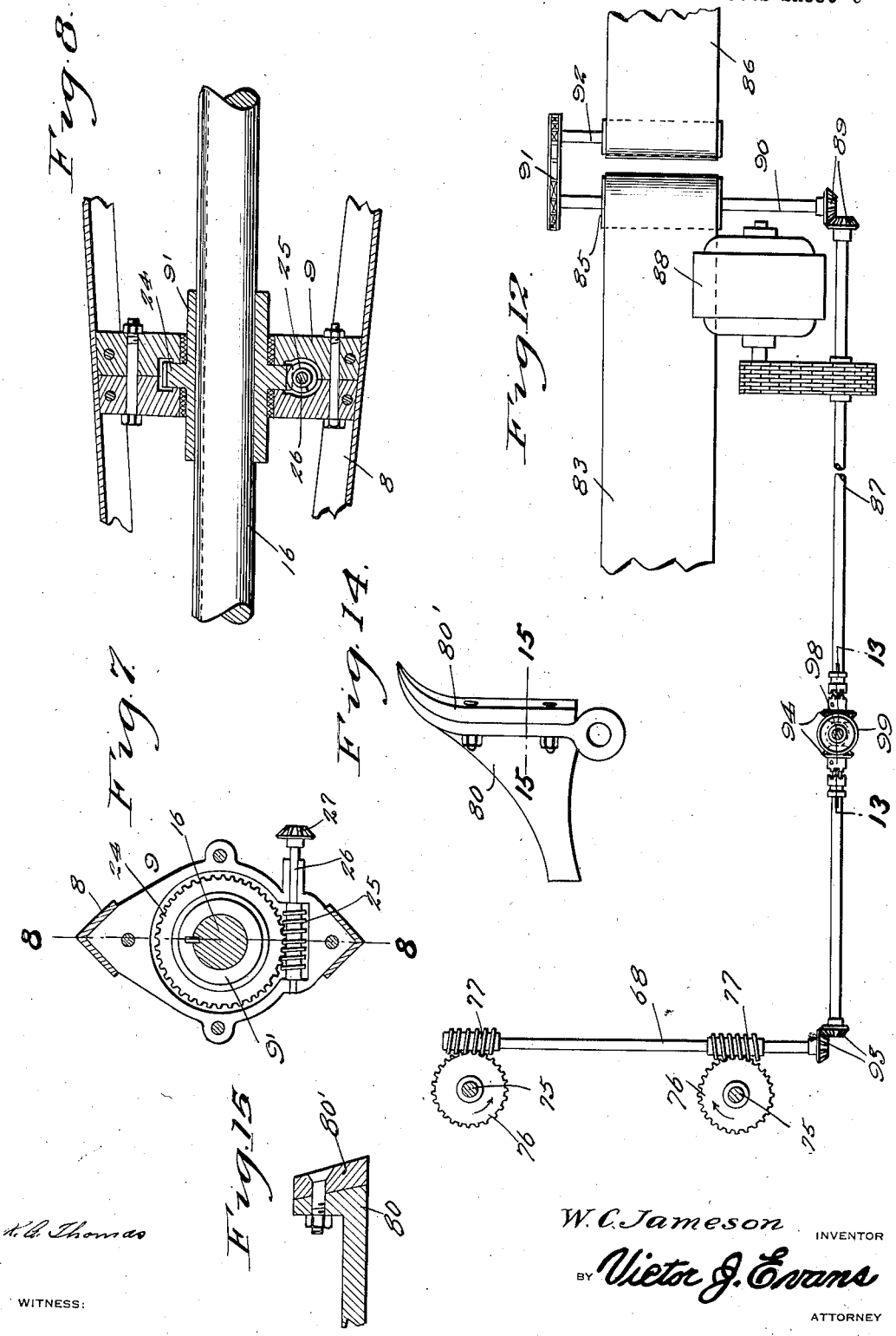

Patented Mar. 23, 1926.

1,577,528

UNITED STATES PATENT OFFICE.

WILLIAM C. JAMESON, OF SABINAL, TEXAS.

TUNNELING MACHINE.

Application filed June 19, 1924. Serial No. 720,984.

*To all whom it may concern:*

Be it known that I, WILLIAM C. JAMESON, a citizen of the United States, residing at Sabinal, in the county of Uvalde and State of Texas, have invented new and useful Improvements in Tunneling Machines, of which the following is a specification.

This invention relates to a tunneling machine, the general object of the invention being to provide an apparatus which will cut its way through dirt and rock in a continuous manner to form a tunnel or opening, thus doing away with the necessity of using powder or dynamite.

Another object of the invention is to provide conveying means for carrying away the material cut by the apparatus to a point where it can be loaded on cars or other vehicles.

A further object of the invention is to provide a power driven carriage for the apparatus and to support the cutting apparatus thereon in such a manner that it can be swung in an arc about a vertical axis and also moved in an arc about a horizontal axis, thus enabling the apparatus to make a tunnel of the desired shape and size.

Another object of the invention is to provide pneumatic means for operating the cutting device with means for regulating the force of the blows of said apparatus.

A further object of the invention is to so arrange the controlling means that the entire apparatus can be handled by a single operator.

Another object of the invention is to provide means whereby the cutting tool and its shaft can be turned by the operator whenever desired or necessary.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 3 is a section on line 3—3 of Figure 1.

Figure 4 is a section on line 4—4 of Figure 2.

Figure 6 is a sectional view through the pneumatic cylinder and a portion of the structure to which it is connected.

Figure 7 is a section on line 7—7 of Figure 1.

Figure 8 is a section on line 8—8 of Figure 7.

Figure 9 is a section on line 9—9 of Figure 1.

Figure 10 is a section on line 10—10 of Figure 3.

Figure 11 is a section on line 11—11 of Figure 1.

Figure 12 is a diagrammatic view of the driving connections.

Figure 13 is a section on line 13—13 of Figure 12.

Figure 14 is a view of one of the gathering arms.

Figure 15 is a section on line 15—15 of Figure 14.

Figure 1:
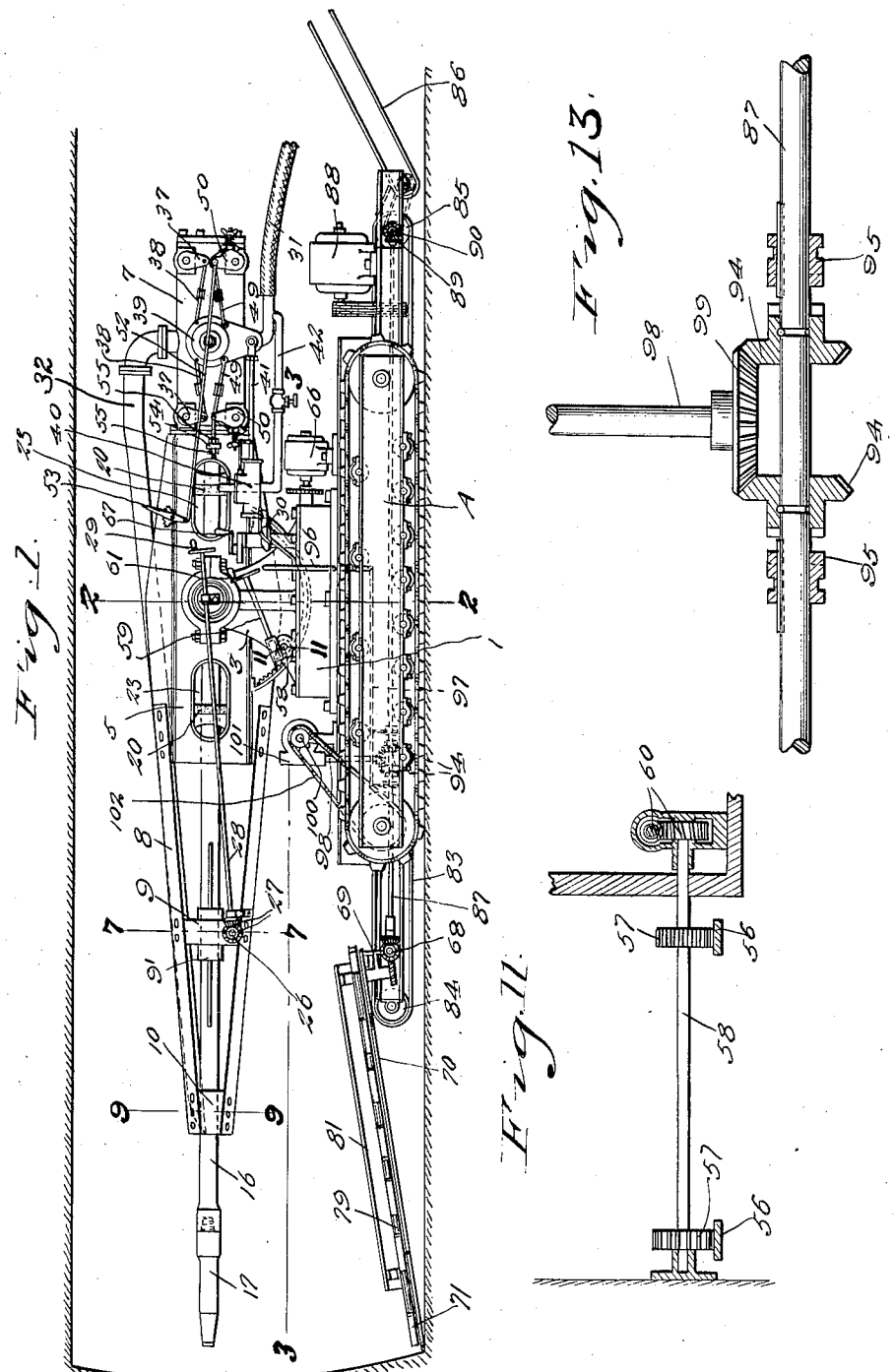
Figure 1 is an elevation showing the invention in use in cutting a tunnel.

In these views, A indicates generally a carriage which is provided with the crawler type of traction elements, shown generally at B. The carriage carries the turn-table base 1 for the turn-table 2 which includes the bearing posts 3, anti-friction means 4 being placed between the table and the base as shown. A casing 5 is provided with trunnions 6 which engage the bearings in the posts so that the casing can be rocked about a horizontal axis and the rear end of the casing has bolted thereto the cylinder 7 of a pneumatic apparatus, the front end of the casing having secured thereto a frame 8 of tapered shape and which carries the bearings 9 and 10. The piston 11 of the cylinder 7 has its rod 12 passing through the abutting ends of the cylinder and casing and through a packing gland 13 carried by the casing and has its outer end threaded to a sliding member 14 which is arranged in a reduced part 15 of the casing. A shaft 16, forming a continuation of the rod 12, has its forward end threaded in the member 14 and said shaft passes through the bearings 9 and 10 and has its outer end fitted to receive the cutting tool 17. Locking nuts 18 are provided on the rod 12 and shaft 16 and engage recesses in the member 14 and a packing strip 19 is inserted between the abutting ends of the cylinder and casing. Bumper strips 20 are placed at the ends of the casing for engagement by the member 14 to prevent the piston 11 from striking the ends of the cylinder. These strips or pads 20 are each carried by a sectional cup-shaped member 21 which is placed in each end of the casing and is bolted to the end, as shown at 22. One member encloses the packing means, as shown, and by making the members of sectional shape they may be passed through the openings 23 formed in the end parts of the casing.

The bearing 10 at the end of the frame 8 includes the rollers 10' of spool-like shape for engaging the shaft and permitting it to be rotated and these rollers are provided with the anti-friction bearings 10''. The bearing 9 includes a sleeve 9' which is keyed to the shaft and which is rotatably mounted in the stationary part of the bearing 9. The central part of the sleeve is provided with a worm gear 24 which engages a worm 25 on a shaft 26 which is connected by the bevel gears 27 with a shaft 28 which has a hand wheel 29 at its other end which is located adjacent the seat 30 for the operator which is placed on the turn-table. Thus the operator can rotate the tool carrying shaft whenever he desires by turning the shaft 26 through means of the shaft 28 and its handle 29, which movement of the shaft 26 will be communicated to the sleeve 9' through the worm connection and as the sleeve is keyed to this shaft, said shaft must turn with the sleeve. The shaft can reciprocate through the sleeve without interference therefrom.

Air is supplied to the cylinder from any suitable source through the pipe connections 31 and the exhaust air from the cylinder is led by the connections 32 to a point at the end of the frame 8 so that it will act to settle the dust arising from the action of the cutting tool 17. The cylinder is provided with the usual inlet passage 33, outlet passage 34, the inlet valve 35 and the outlet valve 36. The exhaust valves 36 have arms 37 attached to the outer ends and these arms are connected by the adjustable connections 38 with the member 39 which is rotatably mounted on the cylinder and which is rocked by means of the small air motor 40 to which it is connected by the rod 41. This motor is supplied with air from the main source by means of the connection 42. A triangular shaped member 43 is connected with each inlet valve and is keyed thereto so that the valve will move with the member and the member is normally held in a position with the valve closed through means of the spring 44 which engages the telescopic rods 45 which connect the member with the cylinder 7. A second member 46 is loosely mounted on the valve stem and carries a spring pressed dog 47 for engaging a pin 48 on the member 43. This member 46 is connected with the member 39 by the adjustable rods 49 so that it will be rocked by the member 39 and this rocking movement will be communicated to the valve, as the dog 47 is in engagement with the pin 48. A cam member 50 is loosely mounted on the valve stem and has its cam part adapted to engage a projection 51 on the dog 47 so as to cause the dog to release the pin 48. Thus by adjusting the member 50 the dog can be made to release the pin at any desired point in the stroke of the piston so as to permit the spring 44 to close the valve and thus shut off the supply of air to the cylinder. By this means the force of the blows struck by the cutting tool can be regulated. If the valve remains open for the full stroke of the piston a blow of great force will be struck but if the cam member 50 is set to release the pin from the dog before the piston ends its stroke the final movement of the piston will simply take place through momentum due to the fact that the valve is closed and thus a lighter blow will be struck. The cam member 50 for the first inlet valve is connected by a rod 52 to a small hand lever 53 arranged adjacent the operator's seat so that the operator can adjust the cam member from the seat to regulate the blows being made by the cutting tool but the cam member of the return stroke valve has its rod 52 passing through an ear 54 on a part of the casing and this rod is adjustable by the pair of nuts 55 thereon which engage the ear as this valve simply controls the flow of air for causing the piston to make its return stroke and this supply of air can remain constant. If the apparatus is working in clay, for instance, and the cutting tool sticks in the same the supply of air for the return stroke would have to be increased so that the piston would pull the tool out of the clay. As the operation of the pneumatic device with its controlling valves is well known and forms no part of the invention, aside from the means just described for regulating the force of blows, it is not thought that a further description is necessary. It will be seen that the rocking movement of the member 39 due to the action of the air motor 40 will first open the forward inlet valve 35 to permit air to pass in the front end of the cylinder to move the piston on its forward stroke and cause the cutting tool to strike the wall of material at the end of the tunnel, the rear outlet valve 36 being opened at the same time to permit the air to escape from the cylinder into the passage 34 and through the pipe connections 32. Then the member 39 will be moved in the opposite direction so as to close the first two valves and open the other valves to cause the piston to return to its forward position. Thus the shaft and the cutting tool will be reciprocated and whenever desired the shaft 16 and the cutting tool can be rotated or partly rotated, as before described, to properly position its cutting edge.

The means for turning the cutting assembly on its trunnions or about a horizontal axis comprises a pair of semi-circular racks 56 which are connected with the casing and which are engaged by the pinions 57 on a shaft 58 which is carried by the turn-table and which is connected with a manually operated shaft 59 by the gears 60, the shaft 59 having a hand wheel 61 thereon which is arranged adjacent the operator's seat. Thus by turning the hand wheel the operator can rotate the shaft 58 so that the pinions engaging the racks 56 will cause the racks to move and thus rock the casing and the parts attached thereto on a horizontal axis which consists of the trunnions 6. The means for turning the turn-table comprises an arc-shaped rack 62 fastened to the turn-table and engaged by a worm 63 on a shaft 64 which is mounted on the base 1 and which is connected by the train of gears 65 to a motor 66 which is carried by the carriage. The controlling means for this motor is shown at 67 and is arranged adjacent the operator's seat. It will thus be seen that by turning the turn-table through means of a motor the cutting end of the apparatus can be swung in a horizontal arc while by turning the manually operated shaft 59 the cutting end of the apparatus can be swung in a vertical arc. Thus tunnels of varying sizes and of different shapes can be cut with the apparatus. In practice the apparatus will preferably be positioned to make a horizontal cut in the lower part of the wall. Then it will be raised to make another horizontal cut a distance of about 18 inches from the first cut so that the material between the two cuts would be knocked off and then other cuts would be made until the top of the tunnel was reached. It will of course be understood, however, that other procedure may be followed if necessary or desired.

Figure 2:
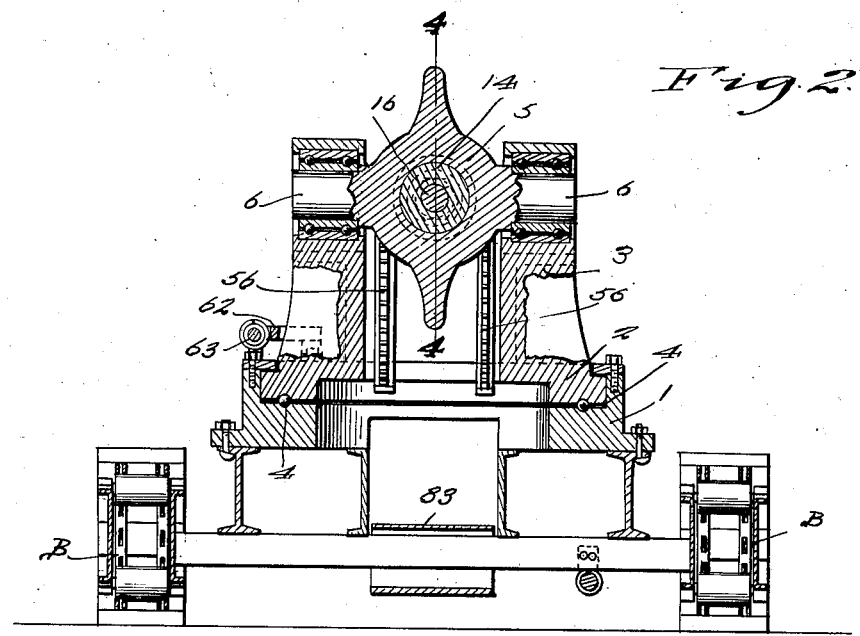
Figure 2 is a section on line 2—2 of Figure 1.
Figure 5:
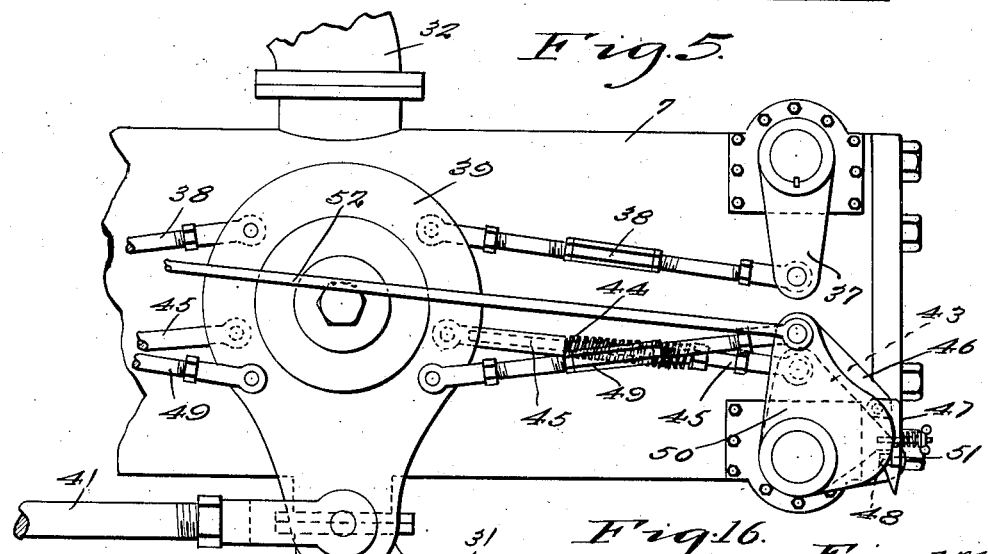
Figure 5 is an enlarged elevation of a part of the pneumatic apparatus showing the valve means thereof.
Figure 19:
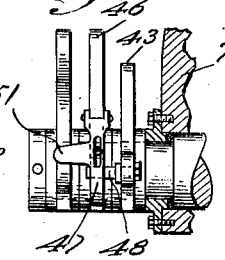
Figure 19 is a front view of the valve operating means.
Figures 16, 17, 18:
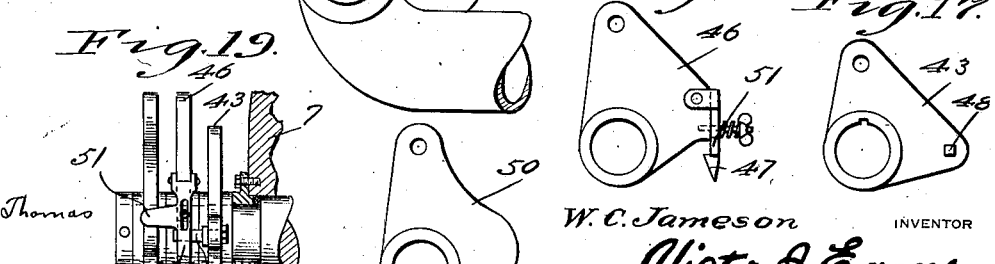
Figure 16 is a view of the dog carrying member of the valve operating means.
Figure 17 is a view of the member which is attached to the valve and carries a pin which is engaged by the dog.
Figure 18 is a view of the cam for releasing the dog from the pin.

A shaft 68 is rotatably mounted in the front extension of the frame A and gathering or pick-up means are pivoted to said shaft, such means consisting of a frame 69 carried by the shaft and to which the plate 70 is attached at its rear end. The plate has a shovel strip 71 attached to its front end, this shovel strip resting upon the floor of the tunnel so that the gathering means are inclinedly arranged, as shown in Figure 1, and as the rear end of such means is pivoted to the shaft the device can ride over irregular parts in the floor of the tunnel while picking up the material cut from the wall by the cutting tool. Strips 72 are fastened to the edges of the plate 70 and form with said plate a conveyor chute. A pair of sprockets 73 is carried by the shovel strip and sprockets 74 are arranged on small vertical shafts 75 which are journaled in the frame 69 and have their lower ends connected to worm gears 76 which mesh with the worms 77 on the shaft 68. Endless chains 79 pass over the sprockets 73 and 74 and gathering arms 80 are carried by these chains. These parts are so arranged that the inner reaches of the chains pass up the chute formed by the plate 70 so as to carry the material from the shovel up the chute and the arms will pass over the ends of the shovel and push the material to the center thereof and then carry it up the chute. Thus the gathering means has a wide range and will remove material from a large surface of the tunnel floor. The conveying means are covered by the shields 81 which are connected with the strips 72 and the braces 82 and these shields extend over the outer reaches of the gathering means and serve to prevent a person being caught by the gathering arms at the sides of the device. The material will drop from the gathering device onto a conveyor 83 which is carried by the carriage and which passes over the rollers 84 and 85 at the forward and rear ends of the carriage. The conveyor passes through the center of the carriage and under the turn-table, as shown in Figure 2. From the conveyor the material will pass to an elevator 86 which may lead it to a dump car or other vehicle at the rear of the device. A shaft 87 is journaled in the carriage and is driven from a motor 88 on the carriage. The rear of the shaft is connected by the gears 89 with a shaft 90 to which the rear conveyor roller 85 is connected and this shaft is connected by the chain and sprockets, shown generally at 91, with the shaft 92 of the elevator. The forward end of the shaft 87 is connected by the bevel gears 93 with the shaft 68 so that the motor will operate the conveyor, the gathering means and the elevator. The bevel gears 94 are loosely mounted on the shaft 87, and clutches 95 are arranged to connect these gears with the shaft, one clutch being thrown into operative position and the other into inoperative position and vice versa by the operator through means of the lever 96 and the connecting means 97. A vertical shaft 98 has a bevel gear 99 on its lower end which meshes with the gears 94 so that when it is in mesh with one gear it will be rotated in one direction and when in mesh with the opposite gear it will be rotated in an opposite direction. The upper end of this shaft is connected with the sectional driving shaft 100 by means of the differential means 101 and said shaft 100 is connected with the driving shafts of the traction means B by the sprockets and chains, shown generally at 102. Thus the motor 88 will also propel the apparatus forward and rearward as desired.

From the foregoing it will be seen that an operator seated on the seat 30 can control the entire apparatus. By moving the lever 96 he can cause the apparatus to move forwardly to its work or to move rearwardly and he can control the movement of the cutting means through the various hand devices as before explained. As will be seen the apparatus will cut the tunnel in a continuous manner and without the use of powder. The material cut by the cutting tool will be picked up by the gathering means and placed on the conveyor which will carry it to the elevator, this elevator carrying the material to a cart or a car or to a point in rear of the apparatus. The force of blow struck by the cutting tool can be regulated to suit the material constituting the tunnel face and by regulating the sweep of the cutting device both horizontally and vertically the shape and size of the tunnel can be controlled.

The gathering arms are of the shape shown in Figures 14 and 15 so that they will pull the material over the shovel and carry it up the chute and I prefer to provide each arm with a detachable wear plate 80'.

What I claim is:—

1. An apparatus of the class described comprising a carriage, a turn-table thereon, power means for rotating the table, a frame pivoted about a horizontal axis on the turn-table, manually operated means for rocking the frame on its pivot, a reciprocating tool carrying shaft in the frame, power means for reciprocating the shaft, means for propelling the carriage either forwardly or rearwardly, gathering means at the front of the carriage, a conveyor for receiving the material from the gathering means, an elevator at the rear of the carriage for receiving the material from the conveyor and means for operating the gathering means, the conveyor and the elevator from the carriage propelling means.

2. An apparatus of the class described comprising a carriage, a motor for propelling the same, gathering means at the front of the carriage, a conveyor for receiving the material from the gathering means and conveying it to the rear of the carriage, an elevator at the rear of the carriage for receiving the material from the conveyor, means for driving the gathering means, the conveyor and the elevator from the motor, a turn-table on the carriage, a second motor for operating the same, a frame pivoted to a horizontal axis on the turn-table, a reciprocating tool carrying shaft in the frame, power means for reciprocating the shaft, an operator's seat on the turn-table and means adjacent the seat for controlling the forward and rearward movement of the carriage, the operation of the turn-table, the rocking movement of the frame and the power means.

3. An apparatus of the class described comprising a carriage, a motor for propelling the same, gathering means at the front of the carriage, a conveyor for receiving the material from the gathering means and conveying it to the rear of the carriage, an elevator at the rear of the carriage for receiving the material from the conveyor, means for driving the gathering means, the conveyor and the elevator from the motor, a turn-table on the carriage, a second motor for operating the same, a frame pivoted to a horizontal axis on the turn-table, a reciprocating tool carrying shaft in the frame, power means for reciprocating the shaft, an operator's seat on the turn-table, means adjacent the seat for controlling the forward and rearward movement of the carriage, the operation of the turn-table, the rocking movement of the frame and the power means and means for rotating the reciprocating shaft from a point adjacent the operator's seat.

4. An apparatus of the class described comprising a carriage, a turn-table thereon, uprights on the turn-table, a casing pivoted between the uprights, a frame connected with the forward end of the casing, a reciprocating member in the casing, a tool shaft passing through the frame and having its end connected with the reciprocating member, a cylinder connected with the rear end of the casing, a piston therein, a piston rod passing into the casing and having its end connected with the reciprocating member, valve means in the cylinder, means for furnishing compressed air to the cylinder through the valve means, means for moving the turn-table and means for rocking the casing on its pivot.

5. An apparatus of the class described comprising a carriage, a turn-table thereon, uprights on the turn-table, a casing pivoted between the uprights, a frame connected with the forward end of the casing, a reciprocating member in the casing, a tool shaft passing through the frame and having its end connected with the reciprocating member, a cylinder connected with the rear end of the casing, a piston therein, a piston rod passing into the casing and having its end connected with the reciprocating member, valve means in the cylinder, means for furnishing compressed air to the cylinder through the valve means, means for moving the turn-table, means for rocking the casing on its pivot, and means for rotating the shaft when desired.

6. An apparatus of the class described comprising a carriage, a power driven turn-table thereon, uprights on the turn-table, a casing pivoted between the uprights, a reciprocating member in the casing, bumper means at each end of the casing, a frame at the front end of the casing, a tool shaft mounted to slide in said frame and passing into the casing and having its end connected with the reciprocating member, a cylinder connected with the rear end of the casing, a piston therein, a piston rod passing into the casing and connected with the reciprocating member, means for reciprocating the piston in the cylinder by compressed air, manually operated means for controlling the flow of compressed air to the cylinder and manually operated means for rocking the casing on its pivot.

In testimony whereof I affix my signature.

WILLIAM C. JAMESON.